US009058805B2

(12) United States Patent
Aleksic et al.

(10) Patent No.: US 9,058,805 B2
(45) Date of Patent: Jun. 16, 2015

(54) MULTIPLE RECOGNIZER SPEECH RECOGNITION

(71) Applicant: Google Inc., Mountain View, CA (US)

(72) Inventors: Petar Aleksic, Jersey City, NJ (US); Pedro J. Mengibar, Jersey City, NJ (US); Fadi Biadsy, New York, NY (US)

(73) Assignee: Google Inc., Mountain View, CA (US)

( * ) Notice: Subject to any disclaimer, the term of this patent is extended or adjusted under 35 U.S.C. 154(b) by 243 days.

(21) Appl. No.: 13/892,590

(22) Filed: May 13, 2013

(65) Prior Publication Data

US 2014/0337032 A1    Nov. 13, 2014

(51) Int. Cl.
| | | |
|---|---|---|
| G10L 15/26 | (2006.01) | |
| G06F 17/27 | (2006.01) | |
| G10L 15/18 | (2013.01) | |
| G06K 9/62 | (2006.01) | |
| G10L 15/01 | (2013.01) | |
| G10L 15/32 | (2013.01) | |
| G10L 15/30 | (2013.01) | |
| G10L 15/197 | (2013.01) | |

(52) U.S. Cl.
CPC ............ G10L 15/01 (2013.01); *H04M 2250/74* (2013.01); G10L 15/32 (2013.01); *G10L 15/30* (2013.01); *G10L 15/197* (2013.01)

(58) Field of Classification Search
CPC . G06K 9/685; G06K 9/00268; G06K 9/6293; G06N 3/049; G10L 15/16; G10L 15/25; G10L 15/063; G10L 15/22; G10L 15/26; G10L 15/1815; G10L 2015/0635
USPC ........ 704/235, 9, 236, E15.014, 243, 10, 257, 704/270, 5; 382/224
See application file for complete search history.

(56) References Cited

U.S. PATENT DOCUMENTS

| | | |
|---|---|---|
| 6,446,076 B1 | 9/2002 | Burkey et al. |
| 6,526,380 B1 | 2/2003 | Thelen et al. |

(Continued)

FOREIGN PATENT DOCUMENTS

EP    736211 B1    3/2004

OTHER PUBLICATIONS

International Search Report and Written Opinion in International Application No. PCT/US2014/034686, mailed Jul. 10, 2014, 10 pages.

(Continued)

*Primary Examiner* — Charlotte M Baker
(74) *Attorney, Agent, or Firm* — Fish & Richardson P.C.

(57) ABSTRACT

The subject matter of this specification can be embodied in, among other things, a method that includes receiving audio data that corresponds to an utterance, obtaining a first transcription of the utterance that was generated using a limited speech recognizer. The limited speech recognizer includes a speech recognizer that includes a language model that is trained over a limited speech recognition vocabulary that includes one or more terms from a voice command grammar, but that includes fewer than all terms of an expanded grammar. A second transcription of the utterance is obtained that was generated using an expanded speech recognizer. The expanded speech recognizer includes a speech recognizer that includes a language model that is trained over an expanded speech recognition vocabulary that includes all of the terms of the expanded grammar. The utterance is classified based at least on a portion of the first transcription or the second transcription.

17 Claims, 5 Drawing Sheets

(56) References Cited

U.S. PATENT DOCUMENTS

| | | |
|---|---|---|
| 7,720,682 B2 | 5/2010 | Stephanick et al. |
| 7,769,142 B2 | 8/2010 | Selbie et al. |
| 7,881,936 B2 | 2/2011 | Longé et al. |
| 8,204,746 B2 | 6/2012 | Odinak |
| 8,346,549 B2 | 1/2013 | Ljolje et al. |
| 8,543,401 B2 * | 9/2013 | Suendermann et al. ...... 704/243 |
| 2004/0019488 A1 | 1/2004 | Portillo |
| 2004/0043758 A1 | 3/2004 | Sorvari et al. |
| 2005/0017954 A1 | 1/2005 | Kay et al. |
| 2005/0175169 A1 | 8/2005 | Boda |
| 2005/0246325 A1 | 11/2005 | Pettinati et al. |
| 2006/0009980 A1 | 1/2006 | Burke et al. |
| 2006/0069564 A1 | 3/2006 | Allison et al. |
| 2007/0208555 A1 | 9/2007 | Blass et al. |
| 2007/0276651 A1 * | 11/2007 | Bliss et al. .................. 704/9 |
| 2008/0270135 A1 | 10/2008 | Goel et al. |
| 2009/0030697 A1 | 1/2009 | Cerra et al. |
| 2009/0326937 A1 | 12/2009 | Chitsaz et al. |
| 2010/0191520 A1 | 7/2010 | Gruhn et al. |
| 2010/0191530 A1 | 7/2010 | Nakano et al. |
| 2011/0015928 A1 | 1/2011 | Odell et al. |
| 2011/0046951 A1 * | 2/2011 | Suendermann et al. ...... 704/236 |
| 2011/0054894 A1 | 3/2011 | Phillips et al. |
| 2011/0054896 A1 | 3/2011 | Phillips et al. |
| 2011/0054900 A1 | 3/2011 | Phillips et al. |
| 2011/0066634 A1 | 3/2011 | Phillips et al. |
| 2011/0143731 A1 | 6/2011 | Ramer et al. |
| 2012/0179457 A1 | 7/2012 | Newman et al. |
| 2012/0179469 A1 | 7/2012 | Newman et al. |
| 2012/0215539 A1 | 8/2012 | Juneja |
| 2012/0271631 A1 | 10/2012 | Weng et al. |
| 2013/0080171 A1 | 3/2013 | Mozer et al. |

OTHER PUBLICATIONS

Everitt et al., "Disambiguating Speech Commands Using Physical Context," ICMI '07, Proceedings of the 9th International Conference on Multimodal Interfaces, 2007, 8 pages.

Hakkani-Tur, Dilek et al., "Unsupervised and Active Learning in Automatic Speech Recognition for Call Classification," Proceedings (ICAASP '04) IEEE International Conferences on Acoustics, Speech, and Signal Processing, 2004, 4 pages.

International Search Report and Written Opinion in PCT/US2013/047780, mailed Aug 23, 2013, 10 pages.

* cited by examiner

MULTIPLE RECOGNIZER SPEECH RECOGNITION

TECHNICAL FIELD

This disclosure relates generally to speech recognition.

BACKGROUND

Speech recognition includes processes for converting spoken words into text. In general, speech recognition systems map verbal utterances into a series of computer-readable sounds, and compare those sounds to known sound patterns associated with words. For example, a microphone may accept an analog signal, which is converted into a digital form that is then divided into smaller segments. The digital segments can be compared to elements of a spoken language. Based on this comparison, and an analysis of the context in which those sounds were uttered, the system is able to recognize the speech.

A typical speech recognition system may include an acoustic model, a language model, and a dictionary. Briefly, an acoustic model includes digital representations of individual sounds that are combinable to produce a collection of words, phrases, etc. A language model assigns a probability that a sequence of words will occur together in a particular sentence or phrase. A dictionary transforms sound sequences into words that can be understood by the language model.

SUMMARY

In general, this document describes systems and techniques for performing speech recognition. In general, an utterance by a user is transcribed by two or more speech recognizers. Each of the recognizers is tuned to a different dictionary. For example, one recognizer may be tuned to recognize words from an expanded, e.g., general-purpose, dictionary, while another may be tuned to a subset of words, e.g., command keywords, and/or a special purpose dictionary such as proper names that are stored in a contact list and may not be available in the expanded dictionary. The transcriptions of the recognizers can be aligned to provide a transcription that includes selected elements of one or more of the recognizers as a transcription of what the user said.

Aspects of the subject matter described in this specification can be embodied in methods, systems, and computer readable media storing instructions executable to perform operations including receiving audio data that corresponds to an utterance, obtaining a first transcription of the utterance that was generated using a limited speech recognizer, wherein the limited speech recognizer includes a speech recognizer that includes a language model that is trained over a limited speech recognition vocabulary that includes one or more terms from a voice command grammar, but that includes fewer than all terms of an expanded grammar, obtaining a second transcription of the utterance that was generated using an expanded speech recognizer, wherein the expanded speech recognizer includes a speech recognizer that includes a language model that is trained over an expanded speech recognition vocabulary that includes all of the terms of the expanded grammar, and classifying the utterance based at least on a portion of the first transcription or the second transcription.

Implementations may include some, all, or none of the following features. The first and second transcriptions of the utterance may be aligned to generate an aligned transcription. The utterance may be classified as one of a voice command or a voice query, and in response to classifying the utterance as the voice command, generate the voice command using at least a portion of the first transcription and at least part of the second transcription and initiate the voice command, and in response to classifying the utterance as the voice query generate the voice query using at least a portion of the first transcription and at least part of the second transcription and initiate the voice query. The limited speech recognizer can be configured to recognize one or more of a collection of placeholder terms, collection of voice command terms, and a collection of contact names from a contact list. The expanded speech recognizer can be configured to recognize one or more of a collection of general grammar terms, a collection of placeholder terms, a collection of proper names, and a collection of voice command terms. The expanded speech recognizer may not be configured to recognize a collection of contact names from a contact list. The operations of at least one of the limited speech recognizer and the expanded speech recognizer can be performed at a mobile device. The operations of at least one of the limited speech recognizer and the expanded speech recognizer can be performed at a server computer device.

The systems and techniques described here may provide one or more of the following advantages. First, a system can provide recognition for terms and names that may not be known to a general-purpose speech recognition system. Second, the system can enhance the privacy of user information. Third, the system can provide improved recognition of spoken phrases that include words found in both a user dictionary and a general purpose dictionary.

The details of one or more implementations are set forth in the accompanying drawings and the description below. Other features and advantages will be apparent from the description and drawings, and from the claims.

DETAILED DESCRIPTION

Figure 1:
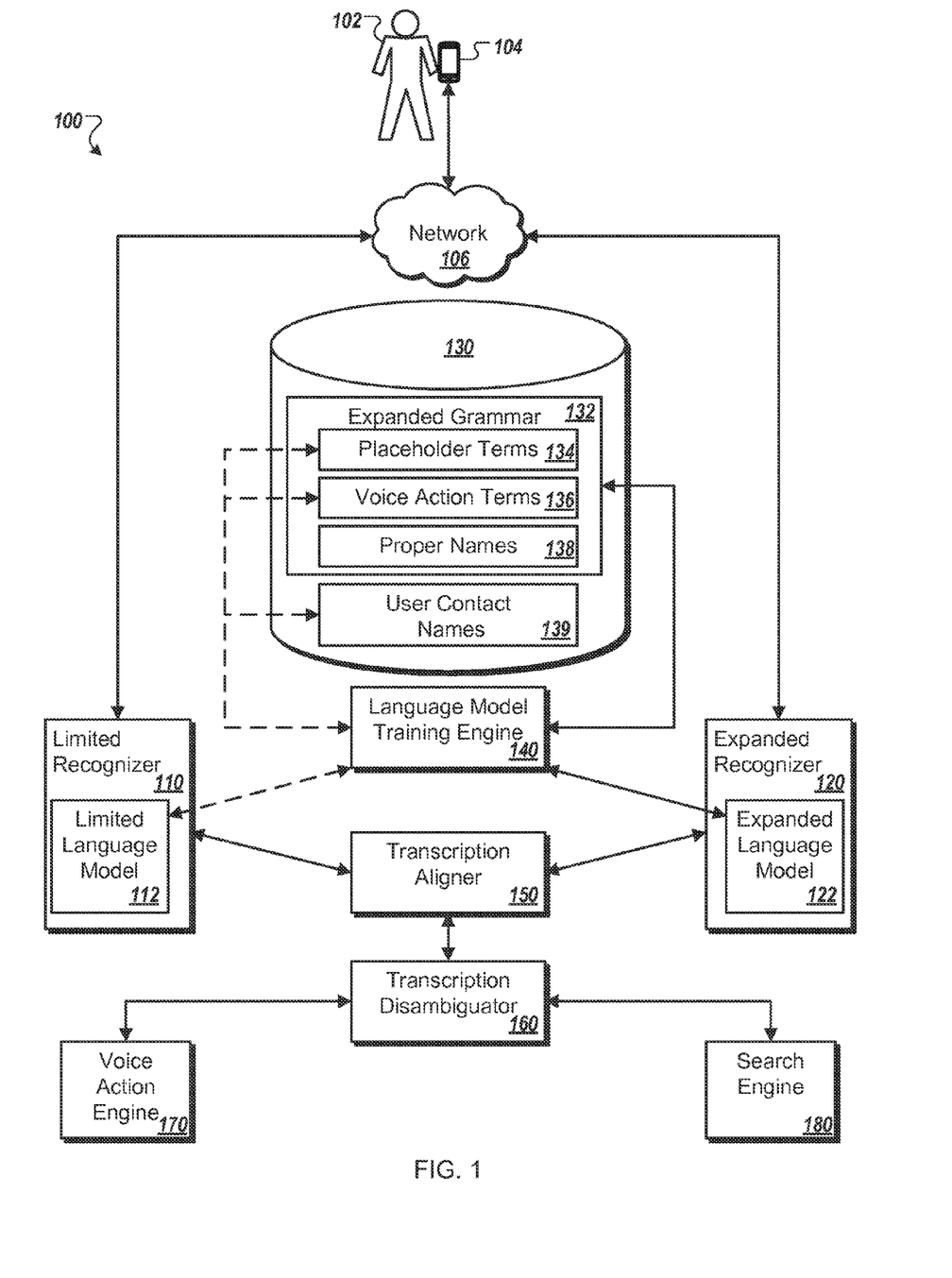
FIG. 1 is a schematic diagram that shows an example of a system for performing speech recognition using multiple speech recognizers.

FIG. 1 shows a schematic diagram that shows an example of a system 100 for performing speech recognition using multiple speech recognizers. In the example of FIG. 1, a user 102 utters a command into a mobile device 104. In this example, the mobile device 104 is a cellular telephone having advanced computing capabilities, known as a smartphone.

The mobile device 104 receives input audio, e.g., speech, provided by user 102 and provides the audio to a limited speech recognizer 110 and to an expanded speech recognizer 120 over a network 106, e.g., the Internet or a cellular data network. The limited speech recognizer 110 and the expanded speech recognizer 120 perform speech-to-text transcription of the utterance made by the user 102. In this example, mobile device 104 may include an application ("app") that receives the input audio. The app may have any appropriate functionality, e.g., it may be a search app, a messaging app, an e-mail app, and so forth. In this regard, an app is used as an example in this case. However, all or part of the functionality of the app may be part of another program downloaded to mobile device 104, part of another program provisioned on mobile device 104, part of the operating system of the mobile device 104, or part of a service available to mobile device 104.

A grammar repository 130 includes at least some of the words and grammar from one or more languages. The grammar repository 130 includes an expanded grammar collection 132, e.g., all or a subset of the words and grammar included in the grammar repository 130. Within the expanded grammar collection 132 are subsets of terms, such as a collection of placeholder terms 134, a collection of voice action terms 136, and a collection of proper names 138. In some implementations, the collection of voice action terms 136 can include a set of known words and/or grammar associated with commands. For example, voice action terms can include words such as "call", "text", "navigate", "send email . . . to . . . subject . . . message . . . ", "set alarm", and other terms that can used with a known set of commands, e.g., "set alarm for six AM", "send email to Hugh Briss, subject 'new phone', message 'I can't wait to show you my new phone', period."

In some implementations, the collection of proper names 138 can include commonly used names of people, e.g., "Bob", "Tiffany", "Smith", "Jones". In some implementations, the collection of proper names 138 can include proper names for well-known people, places, or things, e.g., "Muhammad Ali", "Wolfgang Amadeus Mozart", "Laurentian Abyss", "Walter Reed Army Medical Center".

In some implementations, the collection of placeholder terms 134 can include parts of speech that may be used as "stop" words, e.g., prepositions, conjunctions, interjections. In some implementations, the collection of placeholder terms 134 can include words that the speech recognizers 110 and 120 are to interpret as punctuation, e.g., "period", "question mark", "exclamation point", "hyphen", "dot", "backslash". In some implementations, the collection of placeholder terms 134 can include character strings that are known to represent one or more words in a transcription. For example, the placeholder term "<destination>" may act as a placeholder for utterances that need further transcription in the context of "Navigate to <destination>". Other examples of placeholder terms may include "<subject>", "<recipient>", "<message>", "<place>", "<song>", "<artist>", "<album>", "<unknown>", "<not recognized>", or any other appropriate humanly or machine decipherable collection of characters that can be used to represent a word or phrase.

The expanded language recognizer 120 includes an expanded language model 122. The expanded language model 122 is a language model that is trained by a language model training engine 140 to include a relatively expanded grammar. For example, the language model training engine 140 may access the expanded grammar 132 to train the expanded language model 122 based on some or all of the terms and grammar included in the expanded grammar 132, e.g., based on the placeholder terms 134, the voice action terms 136, the proper names 138.

The limited language recognizer 110 includes a limited language model 112. The limited language model 112 is a language model that is trained by the language model training engine 140 to include a relatively limited subset of the expanded grammar 132 and a collection of user contact names 139. The limited language model 112 is trained using the placeholder terms 134 and the voice action terms 136. For example, the limited language model 112 may be trained to recognize a collection of terms associated with voice commands, e.g., "call", "text", "search", "navigate to". In some implementations, the limited language model 112 may be trained on the collection of user names 139 to provide recognition of names in a private contact list. For example, the user 102 may store contact names on the device 104 locally rather than on a server. In such an example, the device 104 may operate the limited recognizer to perform recognition of names from the user's private contact list without needing to share the contact list beyond the device 104. In another example, the user 102 may store contact names on the device 104, in which the contact names that are uncommon (e.g., non-English names for a user of an English expanded grammar) or names that use terms from the expanded grammar 132 (e.g., "Tiger Woods" may be the name of a golfing buddy rather than a forest for large cats, "Redd Foxx" may be the name of a comedian acquaintance rather than a breed of canine). In some implementations, the limited language model may include words from a user dictionary or private contact list that the user 102 chooses to keep unavailable to resources accessible through the network 106. For example, the user 102 may include words that are commonly used by the user 102 but may not be included in the expanded grammar 130, e.g., foreign words, industry jargon, unusual place names, nicknames.

In some implementations, the limited speech recognizer 110 and/or the expanded speech recognizer 120 may be hosted on the mobile device 104. In some implementations, the limited speech recognizer 110 and/or the expanded speech recognizer 120 may be hosted on by one or more server(s) that is/are remote from mobile device 104. For example, the limited speech recognizer 110 may run locally on the mobile device 104, e.g., to speed up the recognition common commands and/or provide recognition of names in a local contact list, while the expanded speech recognizer 120 may run on a remote server, e.g., to provide access to speech recognition processes that may be too computing, storage, or data intensive to be performed on the mobile device 104 and/or to perform speech recognition over a general-purpose dictionary or multiple languages. In another example, the limited speech recognizer 110 may run on a remote server to augment the recognition capabilities of an expanded speech recognizer 120 by recognizing names and terms from a private contact list and/or user dictionary that the user 102 has chosen to share with the server. In yet another example, the device 104 may have sufficient computing ability to host the limited speech recognizer 110 and the expanded speech recognizer locally, e.g., to provide substantially full multi-recognizer capabilities in an offline mode when the network 106 is unavailable or unwanted for use.

The limited speech recognizer 110 and the expanded speech recognizer 120 both process the utterances provided by the user 102, within the contexts and capabilities of their respective language models 112, 122, to form respective transcriptions of the utterances. For example, the device 104 may store a contact with the name "Nate Godbout" (pronounced "good-boo"). The user may say "send text to Nate Godbout: 'Your package just arrived". The expanded speech recognizer 120 may be relatively better at recognizing the general grammatical terms of the utterance but not the unusual name, e.g., the utterance may be transcribed as "send test to innate good boo your package just arrived." The limited speech recognizer 110 may be relatively better at recognizing the contact name and/or command keywords, but not the general grammatical terms, e.g., the utterance may be transcribed as "send text to Nate Godbout < > < > < > < >", where the character string "< >" represent one or more utterances that the limited recognizer 110 identified as words but was unable to transcribe with sufficiently high confidence within the context the limited language model 112.

The transcriptions determined by the limited speech recognizer 110 and the expanded speech recognizer 120 are provided to a transcription aligner 150. The transcription aligner 150 processes the transcriptions to determine a grammatical alignment of the transcriptions. For example, the transcription aligner 150 may perform pairwise alignment, sequence alignment, or inexact matching to compare the two transcriptions while allowing certain mismatches between the two. For example, the transcription aligner 150 may identify that the words "send" and "to" are present in both transcriptions, and both are separated by one differing word. In such an example, the transcription aligner 150 may determine that the transcriptions should be aligned at the word "send" and/or "to".

The transcription aligner 150 provides the aligned transcriptions to a transcription disambiguator 160. The transcription disambiguator 160 analyzes the aligned transcriptions to determine at least what type of utterance was provided by the user 102, e.g., a voice action command or a voice search command, and what transcribed words are to be used to execute the command. For example, with respect to determining what type of command was uttered, the transcription disambiguator 160 may analyze the aligned transcriptions "send text to Nate Godbout < > < > < > < >" and "send test to innate good boo your package just arrived", and recognize that the words "send text" were recognized by the limited speech recognizer 110, which is tuned to identify voice action terms, at a grammatical position within the utterance that further increases confidence that the utterance was indeed a voice action command. In other examples, the transcription disambiguator 160 may determine a relatively higher level of confidence for the transcription provided by the expanded speech recognizer, and determine that the utterance was a voice search command.

The transcription disambiguator 160 creates a combined transcription from the limited and expanded transcriptions. For example, words or phrases within each transcription may be associated with a confidence score and/or a weight that reflects each word or phrases' likelihood of relevance within the context of a voice action or voice query. The transcription disambiguator 160 compares the confidence scores and/or weights of corresponding pairs of words or phrases from each transcription to determine a combined transcription that represents the utterance and can be used to perform a voice action or a voice query. Examples of disambiguated transcriptions will be discussed further in the descriptions of FIGS. 2A-2F.

The transcription disambiguator 160 provides the disambiguated transcription to either a voice action engine 170 or a search engine 180, e.g., providing the disambiguated transcription to the voice action engine 170 when the utterance is identified as being a voice action and providing the disambiguated transcription to the search engine 180 when the utterance is identified as a voice search. The voice action engine 170, in response to receiving the disambiguated transcription, performs a voice action based on the transcription. For example, the voice action engine 170 may receive a transcription such as "navigate to the nearest post office" and respond by providing driving directions to the user 102. The search engine 180, in response to receiving the disambiguated transcription, performs a search operation. For example, the search engine 180 may receive a transcription such as "what is the phone number for the nearest post office" and respond by performing a web search and providing the results to the user 102.

FIGS. 2A-2F show conceptual examples of utterances that are transcribed by multiple speech recognizers and then disambiguated to determine a combined transcription for use as a voice command or a voice search. In some implementations, the system 100 of FIG. 1 may perform one or more of the speech recognition, transcription, alignment, disambiguation, voice search, and/or voice actions illustrated in FIGS. 2A-2F.

Figure 2A:
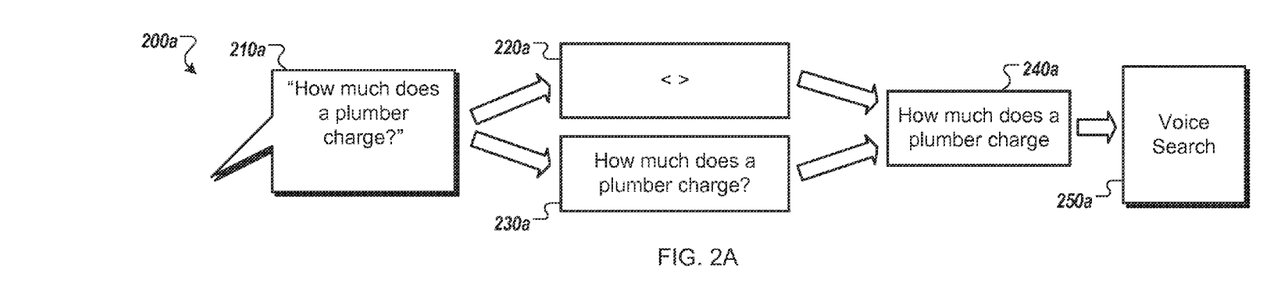
FIGS. 2A-2F show conceptual examples of utterances that are transcribed by multiple speech recognizers.

FIG. 2A is a conceptual block diagram of an example speech recognition process 200a. In the process 200a, an utterance 210a of "how much does a plumber charge?" is received. For example, the utterance 210a may be made by the user 102 speaking into the device 104 of FIG. 1. The utterance 210a is transcribed by a limited speech recognizer, e.g., the limited speech recognizer 110, and an expanded speech recognizer, e.g., the expanded speech recognizer 120. The limited speech recognizer provides a limited transcription 220a, and the expanded speech recognizer provides an expanded transcription 230a.

In the illustrated example, the limited speech recognizer did not recognize any of the words in the utterance 210a, and responds by providing the limited transcription 220a that includes one or more placeholder terms, illustrated as the character string "< >" in this example, to represent words or phrases that the limited recognizer was unable to transcribe with sufficiently high confidence within the context of the limited language model. In the illustrated example, the expanded speech recognizer attempts to recognize all of the words in the utterance 210a, and responds by providing the expanded transcription 230a that includes substantially all of the recognized words.

The limited transcription 220a and the expanded transcription 230a are aligned, e.g., by the transcription aligner 150, and disambiguated, e.g., by the transcription disambiguator 160, to determine whether the utterance 210a was a voice action or a voice search, and to determine a disambiguated transcription 240a, e.g., "how much does a plumber charge". In the illustrated example, the limited speech recognizer was unable to provide any transcribed words with sufficiently high confidence in the limited transcription 220a, and the transcription disambiguator 160 may use the presence and/or content of the limited transcription 220a as an indicator that the utterance 210a is not likely be a voice action, but rather is likely to be a voice search.

In the illustrated example, since the limited transcription 220a did not include any transcribed text, the transcription disambiguator selects substantially all of the expanded transcription 230a for inclusion in the disambiguated transcription 240a, which is provided for use in a voice search operation 250a. For example, the voice search operation 250a may perform a web search query using the disambiguated transcription 240a, e.g., "how much does a plumber charge", to provide search results that describe the fees that plumbers request for various tasks.

Figure 2B:
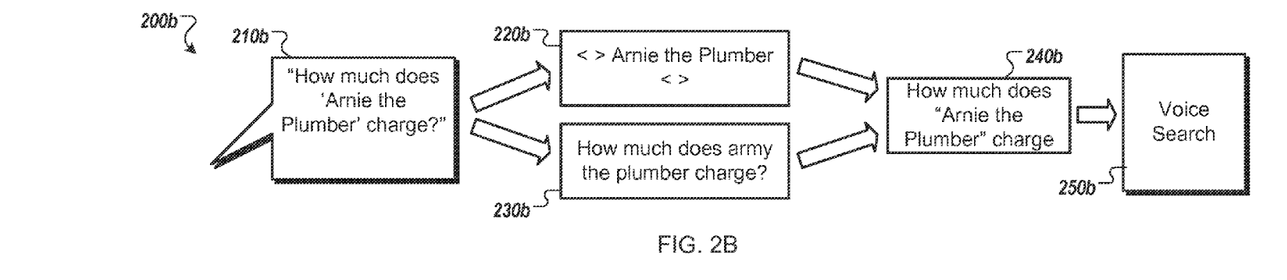

FIG. 2B is a conceptual block diagram of an example speech recognition process 200b. In this and the following examples, we assume that the user has a contact named "Arnie the Plumber" in his contact list, and that contact name is accessible to the limited speech recognizer but not to the expanded speech recognizer.

In the process 200b, an utterance 210b of "how much does 'Arnie the Plumber' charge?" is received. The utterance 210b is transcribed by the limited speech recognizer and the expanded speech recognizer. The limited speech recognizer provides a limited transcription 220b, and the expanded speech recognizer provides an expanded transcription 230b.

In the illustrated example, the limited speech recognizer recognized the contact name "Arnie the Plumber" from the user's private contact list, among other words/phrases that it was unable to transcribe. The limited speech recognizer responds by providing the limited transcription 220b that includes the recognized contact name and one or more placeholder terms, illustrated as the character string "< >", e.g., "< > Arnie the Plumber < >". In the illustrated example, the expanded speech recognizer attempts to recognize all of the words in the utterance 210b, and responds by providing the expanded transcription 230b that includes substantially all of the recognized words it has attempted to recognize. In the illustrated example, however, the expanded speech recognizer does not have access to the user's private contacts, and has erroneously transcribed the contact name "Arnie the Plumber" as "army the plumber", e.g., "how much does army the plumber charge?"

The limited transcription 220b and the expanded transcription 230b are aligned and disambiguated to determine whether the utterance 210b was a voice action or a voice search, and to determine a disambiguated transcription 240b. In the illustrated example, the limited speech recognizer was able to provide a transcription for the contact name, but did not provide any placeholder terms that may indicate that the contact name was uttered in the context of a voice action. The transcription disambiguator 160 may use the presence and/or content of the limited transcription 220b as an indicator that the utterance 210b is not likely be a voice action, but rather is likely to be a voice search that includes the name of one of the user's private contacts, e.g., "How much does 'Arnie the Plumber' charge".

In the illustrated example, since the limited transcription 220b did not include any placeholder terms that were indicative of a voice action, the transcription disambiguator combines the transcribed contact name from the limited transcription 220b with the remainder of the expanded transcription 230b to form the disambiguated transcription 240b, which is provided for use in a voice search operation 250b. For example, the voice search operation 250b may perform a web search query using the disambiguated transcription 240b, e.g., "how much does 'Arnie the Plumber' charge", to provide search results that describe the fees requested by the specific contact "Arnie the Plumber" for various tasks.

In some implementations, a transcribed contact name may be treated as a placeholder term that represents the contact record associated with the contact name, and the contact record may itself be associated with one or more data items. For example, the user may have the contact "Arnie the Plumber" in his contact list, and the user may also have associated a phone number, email address, physical address, website URL, or other information with the contact record for "Arnie the Plumber". In some implementations, the user may configure the limited speech recognizer to provide one or more of the data items in the context of the disambiguated transcription, e.g., the disambiguated transcription 240b may include metadata drawn from the user's contact information, and the voice search operation may use the metadata to improve the quality of the search result provided to the user. For example, there may be two "Arnie the Plumbers" that are searchable on the web, but by including metadata such as the URL, address, and/or phone number from the contact entry that describes the intended "Arnie the Plumber", the voice search operation 250b may be able to provide search results that disambiguate the intended "Arnie the Plumber" from another "Arnie the Plumber" who may be unknown to the user.

Figure 2C:
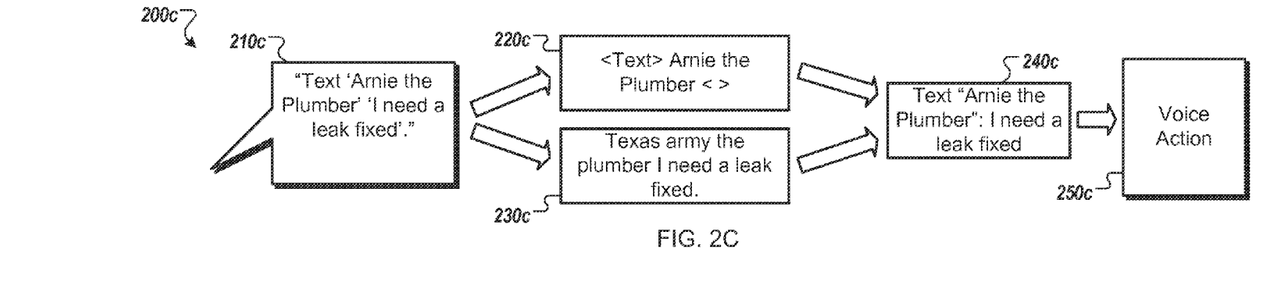

FIG. 2C is a conceptual block diagram of an example speech recognition process 200c. In the process 200c, an utterance 210c of "text 'Arnie the Plumber' 'I need a leak fixed" is received. The utterance 210c is transcribed by the limited speech recognizer and the expanded speech recognizer. The limited speech recognizer provides a limited transcription 220c, and the expanded speech recognizer provides an expanded transcription 230c.

In the illustrated example, the limited speech recognizer recognized the voice command word "text", the contact name "Arnie the Plumber" from the user's private contact list, and other words/phrases that it was unable to transcribe with sufficiently high confidence. The limited speech recognizer responds by providing the limited transcription 220c that includes the recognized contact name and one or more placeholder terms, e.g., "< > Arnie the Plumber < >". In the illustrated example, the expanded speech recognizer attempts to recognize all of the words in the utterance 210c, and responds by providing the expanded transcription 230c that includes substantially all of the recognized words it has attempted to recognize. In the illustrated example, however, the expanded speech recognizer does not have access to the user's private contacts, and has erroneously transcribed the command keyword "text" and the contact name "Arnie the Plumber" as "Texas" and "army the plumber", e.g., "Texas army the plumber I need a leak fixed."

The limited transcription 220c and the expanded transcription 230c are aligned and disambiguated to determine whether the utterance 210c was a voice action or a voice search, and to determine a disambiguated transcription 240c. In the illustrated example, the limited speech recognizer was able to provide a transcription for the command keyword, thereby suggesting to the transcription disambiguator that the user wishes to perform a voice action that involves information about the identified contact.

In the illustrated example, since the limited transcription 220c includes a placeholder term, e.g., "text" that suggests a voice action, the transcription disambiguator combines the command keyword and the transcribed contact name from the limited transcription 220c with the remainder of the expanded transcription 230c to form the disambiguated transcription 240c, which is provided for use in a voice action operation 250c. For example, the voice action operation 250c may perform an operation using the disambiguated transcription 240c, e.g., "text 'Arnie the Plumber' 'I need a leak fixed'", which can cause a text message to be sent to "Arnie the Plumber".

Figure 2D:
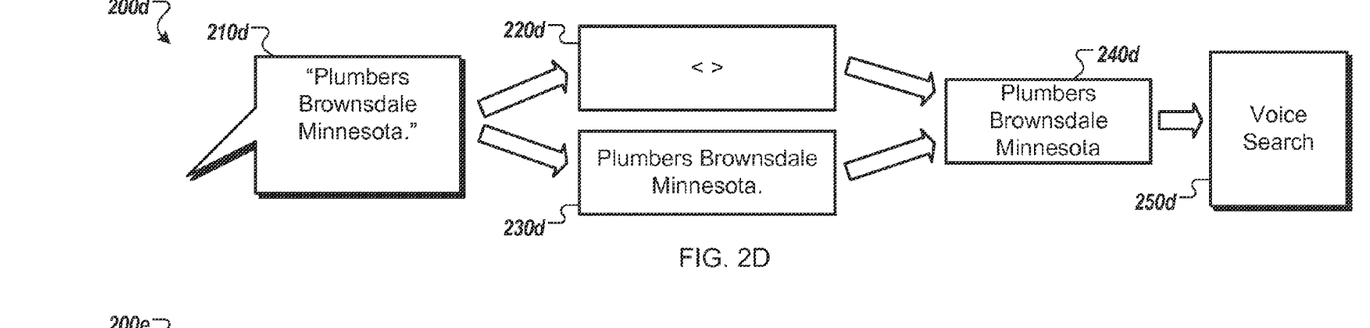

FIG. 2D is a conceptual block diagram of an example speech recognition process 200d. In the process 200d, an utterance 210d of "plumbers Brownsdale Minn." is received. The utterance 210d is transcribed by the limited speech recognizer and the expanded speech recognizer. The limited speech recognizer provides a limited transcription 220d, and the expanded speech recognizer provides an expanded transcription 230d.

In the illustrated example, the limited speech recognizer recognized the unusual place name "Brownsdale" from the user's personal dictionary, which in this example is a word that is absent from an expanded language model. The limited speech recognizer provides placeholder terms for other words/phrases that it was unable to transcribe with sufficiently high confidence. The limited speech recognizer responds by providing the limited transcription 220d that includes the recognized personal dictionary word and one or more placeholder terms, e.g., "< > Brownsdale < >". In the illustrated example, the expanded speech recognizer attempts to recognize all of the words in the utterance 210d, and responds by providing the expanded transcription 230*d* that includes substantially all of the recognized words it has attempted to recognize. In the illustrated example, however, the expanded speech recognizer does not have access to the user's personal dictionary, and has erroneously transcribed the word "Brownsdale" as "bronzed ale", e.g., "plumbers bronzed ale Minnesota."

The limited transcription 220*d* and the expanded transcription 230*d* are aligned and disambiguated to determine whether the utterance 210*d* was a voice action or a voice search, and to determine a disambiguated transcription 240*d*. In the illustrated example, the limited speech recognizer was able to provide a transcription for the personal dictionary term "Brownsdale" but not command keywords, thereby suggesting to the transcription disambiguator that the user wishes to perform a voice search that involves a term from the user's personal dictionary.

In the illustrated example, the transcription disambiguator combines the personal dictionary term from the limited transcription 220*d* with the remainder of the expanded transcription 230*d* to form the disambiguated transcription 240*d*, which is provided for use in a voice search operation 250*d*. For example, the voice search operation 250*d* may perform web search using the disambiguated transcription 240*d*, e.g., "plumbers Brownsdale Minn.", that provides information about plumbing services available near the town of Brownsdale.

Figure 2E:
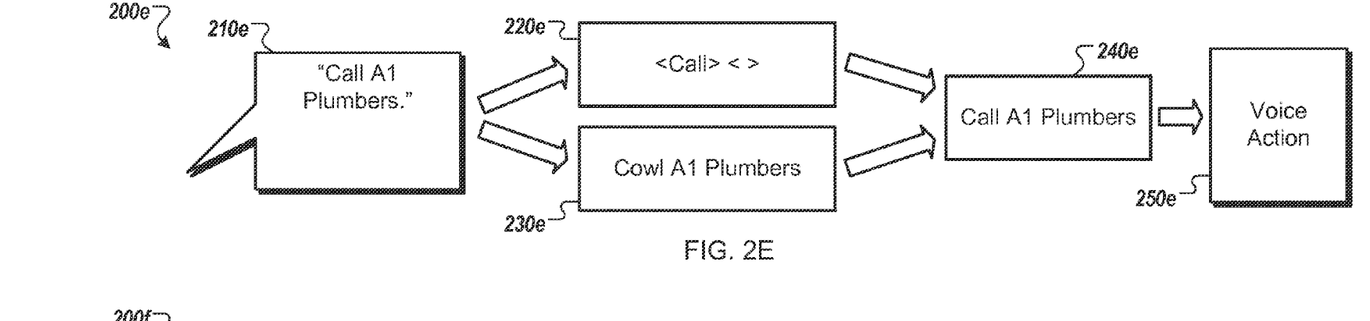

FIG. 2E is a conceptual block diagram of an example speech recognition process 200*e*. In the process 200*e*, an utterance 210*e* of "call A1 Plumbers" is received. The utterance 210*d* is transcribed by the limited speech recognizer and the expanded speech recognizer. The limited speech recognizer provides a limited transcription 220*d*, and the expanded speech recognizer provides an expanded transcription 230*d*.

In the illustrated example, the limited speech recognizer recognized the voice command word "call" and identified other words/phrases that it was unable to transcribe with sufficiently high confidence. The limited speech recognizer responds by providing the limited transcription 220*e* that includes the recognized command keyword and one or more placeholder terms, e.g., "< call > < >". In the illustrated example, the expanded speech recognizer attempts to recognize all of the words in the utterance 210*e*, and responds by providing the expanded transcription 230*e* that includes substantially all of the recognized words it has attempted to recognize. In the illustrated example, however, the expanded speech recognizer has erroneously transcribed the command keyword "call" as "cowl", e.g., "cowl A1 Plumbers."

The limited transcription 220*e* and the expanded transcription 230*e* are aligned and disambiguated to determine whether the utterance 210*e* was a voice action or a voice search, and to determine a disambiguated transcription 240*e*. In the illustrated example, the limited speech recognizer was able to provide a transcription for the command keyword, thereby suggesting to the transcription disambiguator that the user wishes to perform a specific voice action using some words it was unable to transcribe with sufficiently high confidence.

In the illustrated example, since the limited transcription 220*e* includes a placeholder term, e.g., "call" that suggests a voice action, the transcription disambiguator combines the command keyword from the limited transcription 220*e* with the remainder of the expanded transcription 230*e* to form the disambiguated transcription 240*e*, which is provided for use in a voice action operation 250*e*. For example, the voice action operation 250*e* may perform an operation using the disambiguated transcription 240*e*, e.g., "call A1 Plumbers", which can cause the device 104 to initiate a phone call using a phone number obtained from a web search for "A1 Plumbers".

Figure 2F:
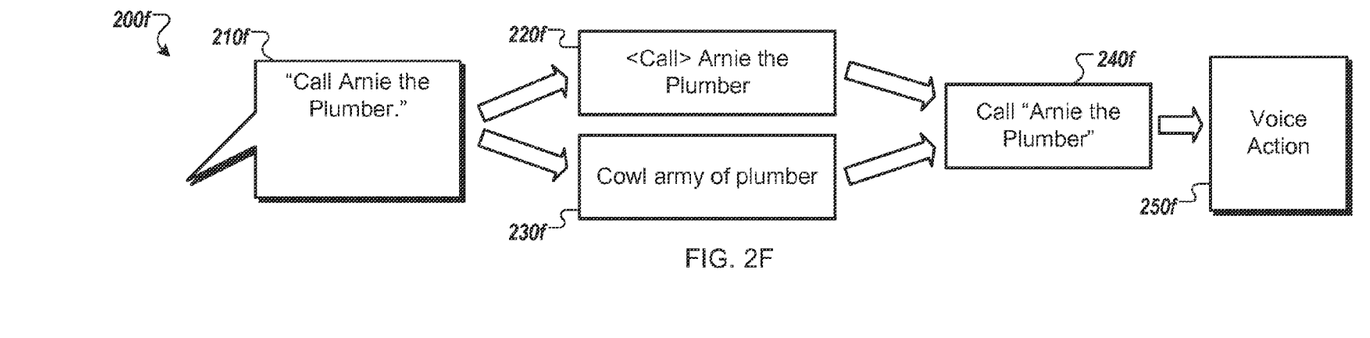

FIG. 2F is a conceptual block diagram of an example speech recognition process 200*f*. In the process 200*f*, an utterance 210*f* of "call Arnie the Plumber" is received. The utterance 210*f* is transcribed by the limited speech recognizer and the expanded speech recognizer. The limited speech recognizer provides a limited transcription 220*f*, and the expanded speech recognizer provides an expanded transcription 230*f*.

In the illustrated example, the limited speech recognizer recognized the voice command word "call" and the contact name "Arnie the Plumber". The limited speech recognizer responds by providing the limited transcription 220*f* that includes the recognized command keyword and contact name, e.g., "< call > < Arnie the Plumber >". In the illustrated example, the expanded speech recognizer attempts to recognize all of the words in the utterance 210*f*, and responds by providing the expanded transcription 230*f* that includes substantially all of the recognized words it has attempted to recognize. In the illustrated example, however, the expanded speech recognizer has erroneously transcribed the command keyword "call" as "cowl", and the contact name "Arnie the Plumber" as "army of plumber", e.g., "cowl army of plumber".

The limited transcription 220*f* and the expanded transcription 230*f* are aligned and disambiguated to determine whether the utterance 210*f* was a voice action or a voice search, and to determine a disambiguated transcription 240*f*. In the illustrated example, the limited speech recognizer was able to provide a transcription for the command keyword, thereby suggesting to the transcription disambiguator that the user wishes to perform a specific voice action for the recognized contact.

In the illustrated example, since the limited transcription 220*f* includes a placeholder term, e.g., "call", that suggests a voice action, the transcription disambiguator combines the command keyword from the limited transcription 220*f* with the remainder of the expanded transcription 230*f* to form the disambiguated transcription 240*f*, which is provided for use in a voice action operation 250*f*. For example, the voice action operation 250*f* may perform an operation using the disambiguated transcription 240*f*, e.g., "call 'Arnie the Plumber", which can cause the device 104 to initiate a phone call using a phone number stored as part of the user's private contact information for "Arnie the Plumber".

Figure 3:
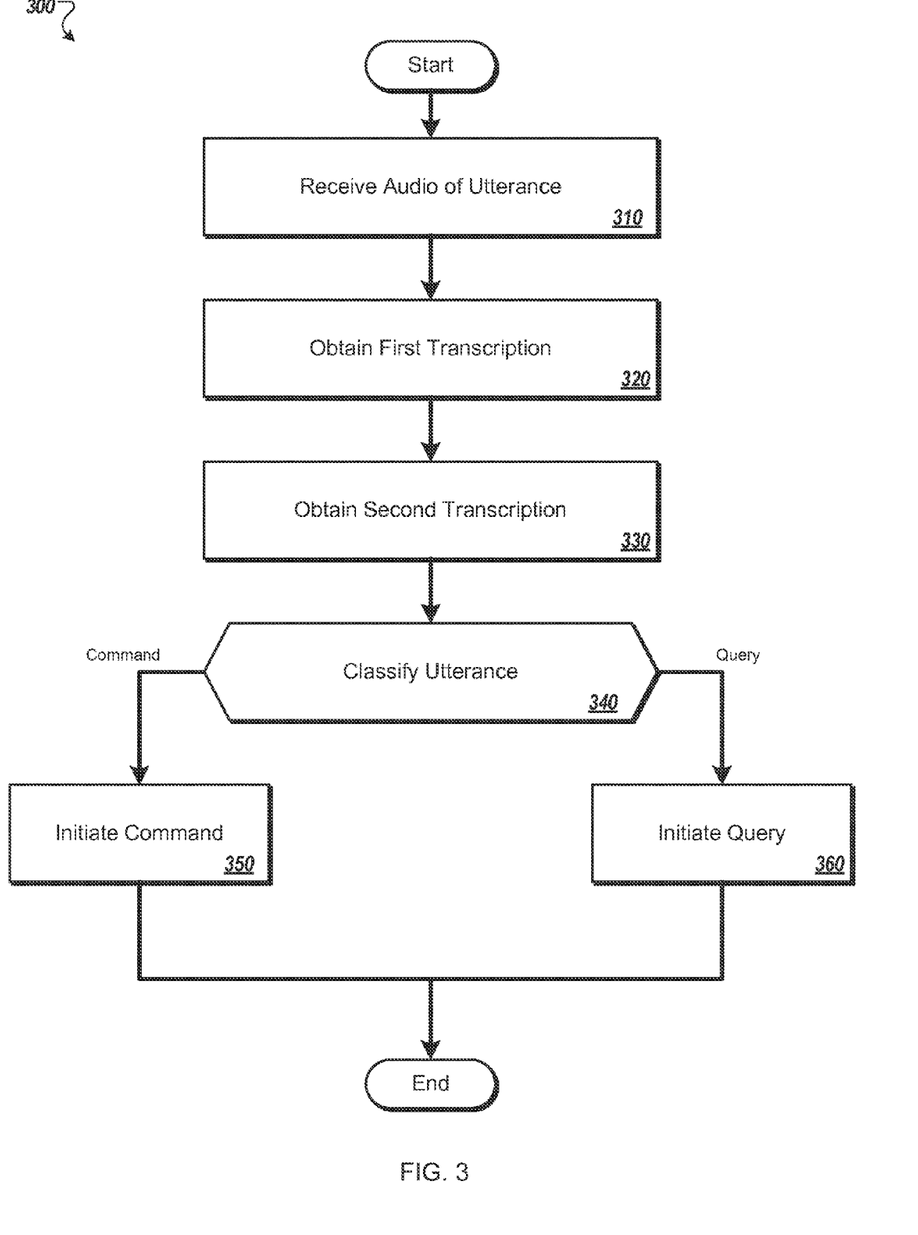
FIG. 3 is a flow diagram of an example process for performing multiple speech recognizer speech recognition.

FIG. 3 is a flow diagram of an example process 300 for performing multiple recognizer speech recognition. In some implementations, the process 300 may be performed by the system 100 of FIG. 1.

The process 300 begins when audio data that corresponds to an utterance is received (310). For example, the user 102 of FIG. 1 may speak one of the utterances 210*a*-210*f* of FIG. 2 into the device 104.

A first transcription of the utterance that was generated using a limited speech recognizer is obtained (320). The limited speech recognizer includes a speech recognizer that includes a language model that is trained over a limited speech recognition vocabulary that includes one or more terms from a voice command grammar, but that includes fewer than all terms of an expanded grammar. For example, the limited speech recognizer 110 transcribes the utterance using the limited language model 112, and the limited language model 112 is trained by the language model training engine 140 to recognize less than the full set of terms included by the expanded grammar 132.

In some implementations, the limited speech recognizer can be configured to recognize one or more of a collection of placeholder terms, collection of voice command terms, and a collection of contact names from a contact list. For example, the language model training engine 140 can train the limited language model 112 using the collection of placeholder terms 134, the collection of voice action terms 136, and the collection of user contact names 139.

A second transcription of the utterance that was generated using an expanded speech recognizer is obtained (330). The expanded speech recognizer includes a speech recognizer that includes a language model that is trained over an expanded speech recognition vocabulary that includes all of the terms of the expanded grammar. For example, the expanded speech recognizer 120 transcribes the utterance using the expanded language model 122, and the expanded language model 122 is trained by the language model training engine 140 to recognize a set of terms included by the expanded grammar 132 that is relatively larger than the set of expanded grammar terms included by the limited language model 112.

In some implementations, the expanded speech recognizer can be configured to recognize one or more of a collection of general grammar terms, a collection of placeholder terms, a collection of proper names, and a collection of voice command terms. For example, the language model training engine 140 can train the expanded language model 122 using the general grammar 132, the collection of placeholder terms 134, the collection of voice action terms 136, and the collection of proper names 139. In some implementations, the expanded speech recognizer may not be configured to recognize a collection of contact names from a contact list. For example, the expanded language model 122 may not have access to, or be trained to recognize, names stored by the user 102 as private contacts on the device 104.

In some implementations, the first and second transcriptions of the utterance may be aligned to generate an aligned transcription. For example, the transcription aligner 330 may process the limited and expanded transcriptions to determine an alignment between the two, such that the recognized words from one transcription can correspond to their recognized counterparts in the other transcription.

The utterance is classified (340) based at least on a portion of the first transcription or the second transcription. In some implementations, the utterance can be classified (340) as one of a voice command or a voice query. In response to classifying the utterance as the voice command, the voice command is be generated using at least a portion of the first transcription and at least part of the second transcription, and the voice command is initiated (350). For example, in the process 200*c* the transcription disambiguator 160 can determine that the utterance 210*c* is a voice command, combine terms from the limited transcription 220*c* and the expanded transcription 230*c* to produce the disambiguated transcription 240*c*, and initiate the voice action 250*c* based on the disambiguated transcription 240*c*. In response to classifying the utterance as the voice query, the voice query is generated using at least a portion of the first transcription and at least part of the second transcription, and the voice query is initiated (360). For example, in the process 200*b* the transcription disambiguator 160 can determine that the utterance 210*b* is a voice query, combine terms from the limited transcription 220*b* and the expanded transcription 230*b* to produce the disambiguated transcription 240*b*, and initiate the voice search 250*b* based on the disambiguated transcription 240*b*.

In some implementations, the operations of the limited speech recognizer and/or the expanded speech recognizer may be performed at a mobile device. For example, the limited speech recognizer 110 and/or the expanded speech recognizer 120 can be executed by the mobile device 104. In some implementations, the operations of the limited speech recognizer and/or the expanded speech recognizer may be performed at a server computer device. For example, the limited speech recognizer 110 and/or the expanded speech recognizer 120 can be executed by one or more sever computers accessible to the mobile device 104 over the network 106.

In some implementations, the operations of the limited speech recognizer may be performed at a mobile device, and the operations of the expanded speech recognizer may be performed at a server computer device. For example, the limited speech recognizer 110 may operate on the mobile device 104 to provide recognition of contact names, private dictionary terms, and/or limited offline speech recognition functions, while the expanded speech recognizer 120 may operate on a server device accessible to the mobile device 104 over the network 106 to provide speech recognition functions that may be too computationally intensive to be performed in a timely manner by the mobile device 104.

Figure 4:
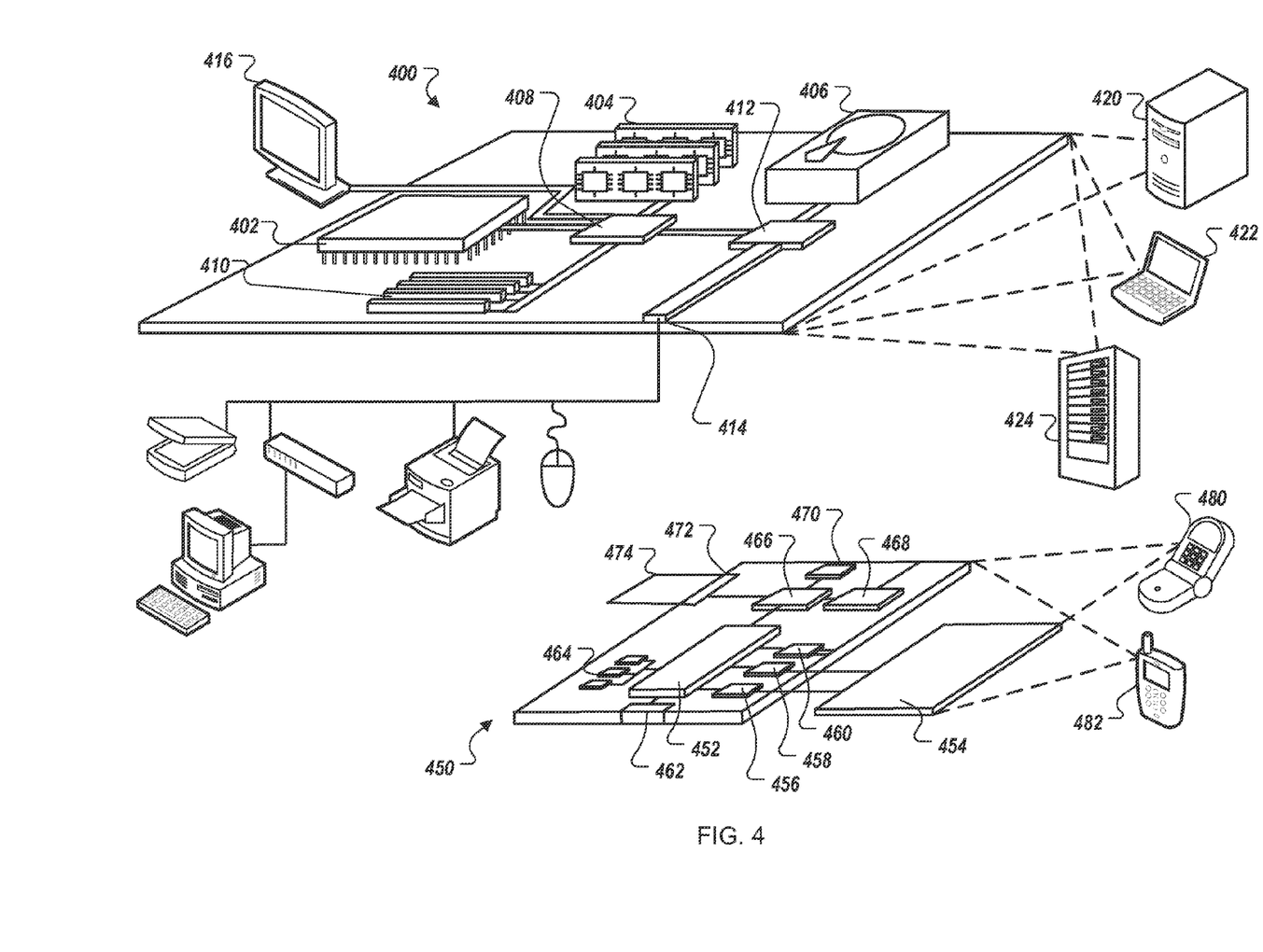
FIG. 4 is a block diagram of example computing devices that may be used to implement multiple speech recognizer speech recognition.

FIG. 4 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method performed by a data processing apparatus, the method comprising:
   receiving audio data that corresponds to an utterance;
   obtaining a first transcription of the utterance that was generated using a limited speech recognizer, wherein the limited speech recognizer comprises a speech recognizer that includes a language model that is trained over a limited speech recognition vocabulary that includes one or more terms from a voice command grammar, but that includes fewer than all terms of an expanded grammar;
   obtaining a second transcription of the utterance that was generated using an expanded speech recognizer, wherein the expanded speech recognizer comprises a speech recognizer that includes a language model that is trained over an expanded speech recognition vocabulary that includes all of the terms of the expanded grammar;
   aligning the first and second transcriptions of the utterance to generate an aligned transcription; and
   classifying the utterance, based at least on a portion of the aligned transcription, as a voice command or a voice query.

2. The method of claim 1, wherein the operations of at least one of the limited speech recognizer and the expanded speech recognizer are performed at a server computer device.

3. The method of claim 1, further comprising:
   in response to classifying the utterance, based at least on a portion of the aligned transcription, as the voice command:
      generating the voice command using at least a portion of the first transcription and at least part of the second transcription; and
      initiating the voice command; and
   in response to classifying the utterance as the voice query:
      generating the voice query using at least a portion of the first transcription and at least part of the second transcription; and
      initiating the voice query.

4. The method of claim 1, wherein the limited speech recognizer is configured to recognize one or more of a collection of placeholder terms, a collection of voice command terms, and a collection of contact names from a contact list.

5. The method of claim 1, wherein the expanded speech recognizer is configured to recognize one or more of a collection of general grammar terms, a collection of placeholder terms, a collection of proper names, and a collection of voice command terms.

6. The method of claim 5, wherein the expanded speech recognizer is not configured to recognize a collection of contact names from a contact list.

7. The method of claim 1, wherein the operations of at least one of the limited speech recognizer and the expanded speech recognizer are performed at a mobile device.

8. A system comprising:
   a data processing apparatus; and
   a non-transitory memory storage storing instructions executable by the data processing apparatus and that upon such execution cause the data processing apparatus to perform operations comprising:
      receiving audio data that corresponds to an utterance;
      obtaining a first transcription of the utterance that was generated using a limited speech recognizer, wherein the limited speech recognizer comprises a speech recognizer that includes a language model that is trained over a limited speech recognition vocabulary that includes one or more terms from a voice command grammar, but that includes fewer than all terms of an expanded grammar;
      obtaining a second transcription of the utterance that was generated using an expanded speech recognizer, wherein the expanded speech recognizer comprises a speech recognizer that includes a language model that is trained over an expanded speech recognition vocabulary that includes all of the terms of the expanded grammar;

aligning the first and second transcriptions of the utterance to generate an aligned transcription; and classifying the utterance based at least on a portion of the aligned transcription, as a voice command or a voice query.

9. The system of claim 8, wherein the operations of at least one of the limited speech recognizer and the expanded speech recognizer are performed at a mobile device.

10. The system of claim 8, the operations further comprising:

in response to classifying the utterance, based at least on a portion of the aligned transcription, as the voice command:

generating the voice command using at least a portion of the first transcription and at least part of the second transcription; and initiating the voice command; and in response to classifying the utterance as the voice query:

generating the voice query using at least a portion of the first transcription and at least part of the second transcription; and initiating the voice query.

11. The system of claim 8, wherein the limited speech recognizer is configured to recognize one or more of a collection of placeholder terms, a collection of voice command terms, and a collection of contact names from a contact list.

12. The system of claim 8, wherein the expanded speech recognizer is configured to recognize one or more of a collection of general grammar terms, a collection of placeholder terms, a collection of proper names, and a collection of voice command terms.

13. The system of claim 12, wherein the expanded speech recognizer is not configured to recognize a collection of contact names from a contact list.

14. A non-transitory computer readable medium storing instructions executable by a data processing apparatus and that upon such execution cause the data processing apparatus to perform operations comprising:

receiving audio data that corresponds to an utterance;

obtaining a first transcription of the utterance that was generated using a limited speech recognizer, wherein the limited speech recognizer comprises a speech recognizer that includes a language model that is trained over a limited speech recognition vocabulary that includes one or more terms from a voice command grammar, but that includes fewer than all terms of an expanded grammar;

obtaining a second transcription of the utterance that was generated using an expanded speech recognizer, wherein the expanded speech recognizer comprises a speech recognizer that includes a language model that is trained over an expanded speech recognition vocabulary that includes all of the terms of the expanded grammar;

aligning the first and second transcriptions of the utterance to generate an aligned transcription; and classifying the utterance based at least on a portion of the aligned transcription, as a voice command or a voice query.

15. The computer readable medium of claim 14, the operations further comprising:

in response to classifying the utterance, based at least on a portion of the aligned transcription, as the voice command:

generating the voice command using at least a portion of the first transcription and at least part of the second transcription; and initiating the voice command; and in response to classifying the utterance as the voice query:

generating the voice query using at least a portion of the first transcription and at least part of the second transcription; and initiating the voice query.

16. The computer readable medium of claim 14, wherein the limited speech recognizer is configured to recognize one or more of a collection of placeholder terms, a collection of voice command terms, and a collection of contact names from a contact list.

17. The computer readable medium of claim 14, wherein the expanded speech recognizer is configured to recognize one or more of a collection of general grammar terms, a collection of placeholder terms, a collection of proper names, and a collection of voice command terms.

* * * * *